(12) United States Patent  (10) Patent No.: US 8,275,784 B2
Cao et al.  (45) Date of Patent:  Sep. 25, 2012

(54) TRANSLATION SYSTEM AND METHOD FOR SPARQL QUERIES

(75) Inventors: Feng Cao, Shanghai (CN); Gang Hu, Beijing (CN); Li Ma, Beijing (CN); Yue Pan, Beijing (CN); Xing Zhi Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 12/732,240

(22) Filed: Mar. 26, 2010

(65) Prior Publication Data

US 2010/0250577 A1   Sep. 30, 2010

(30) Foreign Application Priority Data

Mar. 31, 2009  (CN) .......................... 2009 1 0132545

(51) Int. Cl.
*G06F 7/00* (2006.01)

(52) U.S. Cl. ....................................... 707/760

(58) Field of Classification Search .................. 707/759, 707/760, 764, 771, 999.003–999.005
See application file for complete search history.

(56) References Cited

U.S. PATENT DOCUMENTS

| | | | |
|---|---|---|---|
| 6,539,371 B1 | 3/2003 | Bleizeffer et al. | |
| 7,318,055 B2 | 1/2008 | Britton et al. | |
| 7,818,352 B2 * | 10/2010 | Krishnamoorthy et al. | .. 707/803 |
| 2006/0235837 A1 * | 10/2006 | Chong et al. | ...................... 707/4 |
| 2007/0233627 A1 * | 10/2007 | Dolby et al. | .................... 706/45 |
| 2008/0040308 A1 | 2/2008 | Ranganathan et al. | |
| 2008/0256026 A1 * | 10/2008 | Hays | ............................... 707/2 |
| 2009/0138437 A1 * | 5/2009 | Krishnamoorthy et al. | ...... 707/3 |
| 2009/0138498 A1 * | 5/2009 | Krishnamoorthy et al. | .. 707/103 R |

* cited by examiner

*Primary Examiner* — Hung T Vy
(74) *Attorney, Agent, or Firm* — Vazken Alexanian (57) ABSTRACT

A computer-implemented system and method for translating a SPARQL query. The system includes: a parser/lexer for parsing the SPARQL query; a hidden negative pattern detector for detecting a hidden negative pattern in the parsed SPARQL query; a hidden negative pattern translator for translating the detected hidden negative pattern into an explicit negative pattern; a separator for separating the explicit negative pattern from a positive pattern in the parsed SPARQL query; a negative pattern translator for translating the explicit negative pattern into a negative portion of an SQL statement; a positive pattern translator for translating the positive pattern into a positive portion of the SQL statement; and an SQL statement combiner for combining the negative portion of the SQL statement with the positive portion of the SQL statement.

10 Claims, 8 Drawing Sheets

Positive Pattern → <?x typeof item A>

Hidden Negative Pattern → <?y typeof item A><?y color white>

Filter(?x!=?y)

TRANSLATION SYSTEM AND METHOD FOR SPARQL QUERIES

CROSS-REFERENCE TO RELATED APPLICATIONS

This application claims priority under 35 U.S.C. §119 to Chinese Patent Application No. 200910132545.7 filed Mar. 31, 2009, the entire contents of which are incorporated by reference herein.

BACKGROUND OF THE INVENTION

1. Field of the Invention

The present invention relates to database queries, particularly to the execution efficiency of database query statements, and more specifically to a translation system and method for SPARQL queries.

2. Description of the Related Art

In recent years, the success of relational database management systems (R-DBMS) has brought volumes of data in horizontal schemas. With the increased use of ontology in various applications, supporting RDF (Resource Description Framework) query against legacy R-DBMS has gained attention from both relational database and semantic web communities. On one hand, representing relational data as RDF graphs provides unified access to different sources for information federation and integration. On the other hand, exposing a large amount of data locked in relational databases can enrich content on the semantic web.

Figure 1:
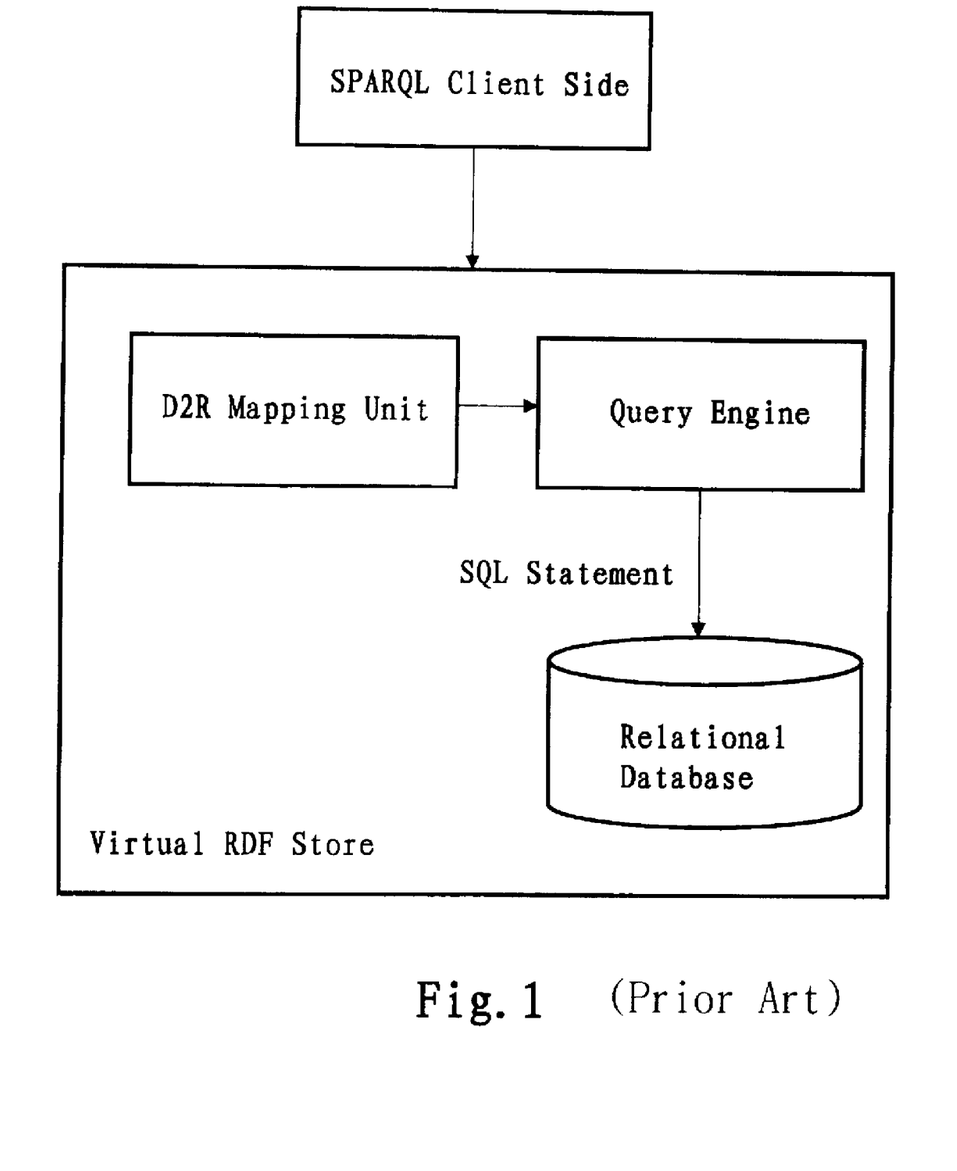
FIG. 1 is a block diagram showing an application environment.

FIG. 1 shows a structural block diagram of a virtual RDF store. At the client, a query is made using SPARQL (Simple Protocol and RDF Query Language), and a query engine translates SPARQL statements into SQL statements using a D2R (Database to Relational database) mapping unit so as to query the relational database.

SPARQL is recommended by the W3C (World Wide Web Consortium) for RDF query language and is a query language and data acquisition protocol developed for RDF. The building blocks of SPARQL include the following clauses:

Triple: <subject predicate object> (abbr. <s p o>)
"AND" Pattern: <s p o> <s p o>
"OR" Pattern: <s p o> UNION <s p o>
Filter conditions: Filter (conditions)

Typically, semantic queries can be divided into two categories, i.e. positive semantic queries and negative semantic queries. For example, in order to find all items A that are white in color in a store, a simple positive SPARQL query can be made as follows:

<?x typeof item $A$><?x color white>

To find all items A that are not white in the store, the following query can be made:

<?x typeof type $A$ item>!<?x color white>        (1), where "!" represents logical "Not". The symbol "!" is only an example, and those skilled in the art should appreciate that, any representation capable of expressing "Not" logic is feasible. However, all syntax patterns in the existing SPARQL language are expressed in positive forms and there is not such a syntax structure as "!<s p o>", that is, direct queries in negative patterns are not supported, structure like "!<?x color white>" in the expression (1) is not supported.

As another example, assume a search is desired for two products that can be sold as a bundle via a third product but cannot be directly sold as a bundle, and neither of which can be sold as a bundle individually. Assume that the bundle-sale conditions of articles in a certain store are as follows (we use "-" to denote bundle-sale relationship):

(a) item B-item A, item A-item C;
(b) item B-item D, item D-item E, item B-item E.

Assuming that item B and item C cannot be sold as a bundle, but they can be sold through a bundle via item A. Then, if a query is made according to the following expression (2), Select?x,?z where {<?x BundleSale?y><?y
    BundleSale?z>!<?x BundleSale?z>!<?x
    BundleSale?x>}        (2), a result of the query will be (a).

From the above, it follows that a query in an explicit negative pattern such as "!<s p o>" is quite useful. However, there are no syntax structures of an explicit negative pattern in the existing SPARQL language.

Thus, in the prior art, negative patterns are indirectly expressed in a positive way in the existing SPARQL language, which is abstracted as a relational algebra formula P1!P2=P1−P1P2, where "P1P2" represents two triples combined using an "AND" logic, called a hidden negative pattern. For example, the query in the expression (1) can be expressed in the following form:

Select?x where {<?x typeof item $A$><?y typeof item
    $A$><?y color white>Filter(?x!=?y)}

As another example, the query in the expression (2) can be expressed in the following form:

Select?x,?z where {<?x BundleSale?y><?y
    BundleSale?z><?m BundleSale?o><?o
    BundleSale?n><?m BundleSale?n><?a
    BundleSale?b><?b BundleSale?c><?a
    BundleSale?a>Filter((?x!=?m OR ?z !=?n)OR
    (?x!=?a OR?z!=?c))}

However, in a practical operational process of compiling the above-mentioned hidden negative pattern into an SQL statement, the unequal condition "?x!=?y" will yield many unnecessary JOIN operations, thus incurring high space costs. In addition, the "!=" operation may be very complicated in the translated SQL statement. Moreover, the unequal condition will be translated into a combination of several positive assertions and several negative assertions, thus increasing computation cost. In summary, the existing SPARQL queries cannot support full semantic queries, and the existing systems and methods for translation of SPARQL into SQL do not perform efficiently.

SUMMARY OF THE INVENTION

The present invention provides a computer-implemented system and method of efficiently translating a SPARQL query statement into a SQL statement.

According to one aspect of the present invention, a computer-implemented system is provided for translating a SPARQL query. The system includes: a parser/lexer for parsing the SPARQL query; a hidden negative pattern detector for detecting a hidden negative pattern in the parsed SPARQL query; a hidden negative pattern translator for translating the detected hidden negative pattern into an explicit negative pattern; a separator for separating the explicit negative pattern from a positive pattern in the parsed SPARQL query; a negative pattern translator for translating the explicit negative pattern into a negative portion of an SQL statement; a positive pattern translator for translating the positive pattern into a positive portion of the SQL statement; and an SQL statement combiner for combining the negative portion of the SQL statement with the positive portion of the SQL statement.

According to another aspect of the present invention, a computer-implemented method is provided for translating a SPARQL query. The method includes the steps of: parsing the SPARQL query; detecting a hidden negative pattern in the parsed SPARQL query; translating the detected hidden negative pattern into an explicit negative pattern; separating the explicit negative pattern from a positive pattern in the parsed SPARQL query; translating the explicit negative pattern into a negative portion of an SQL statement; translating the positive pattern into a positive portion of the SQL statement; and combining the negative portion of the SQL statement with the positive portion of the SQL statement.

According to still another aspect of the present invention, a computer-implemented system is provided for translating a SPARQL query. The system includes: a parser/lexer for parsing the SPARQL query; a pattern separator for detecting a hidden negative pattern in the parsed SPARQL query, and separately outputting the detected hidden negative pattern and a positive pattern; a negative pattern translator for translating the detected hidden negative pattern into a negative portion of an SQL statement; a positive pattern translator for translating the positive pattern into a positive portion of the SQL statement; and a combiner for combining the negative portion of the SQL statement with the positive portion of the SQL statement.

According to yet another aspect of the present invention, a computer-implemented method is provided for translating a SPARQL query. The method includes the steps of: parsing the SPARQL query; detecting a hidden negative pattern in the SPARQL query, and separately outputting the detected hidden negative pattern and a positive pattern; translating the detected hidden negative pattern into a negative portion of an SQL statement; translating the positive pattern into a positive portion of the SQL statement; and combining the negative portion of the SQL statement with the positive portion of the SQL statement.

DETAILED DESCRIPTION OF THE PREFERRED EMBODIMENTS

The exemplary embodiments of the present invention are specifically described below with reference to the drawings.

The present invention improves the translation process of SPARQL queries into SQL queries. An expression in an explicit negative pattern is introduced, and in the process of translating an SPARQL statement into an SQL statement, a hidden negative pattern in the SPARQL statement is first translated into an explicit negative pattern, thereby optimizing the translation process and the obtained SQL statement.

In one embodiment of the present invention, the explicit negative pattern is represented as "!<s p o>", that is, a flag of negation "!" is added in front of a typical triple. "!<s p o>" means that there is no instance of <s p o>. In a closed world, the assumption is !<s p o>=<s !p o>. However, a person skilled in the art can realize that other representations are also feasible.

After the explicit negative pattern is defined, any existing negative pattern in the SPARQL can be expressed using the explicit negative pattern:

negation of Triple: !<s p o>
negation of "AND" pattern: !<s p o> UNION !<s p o>
negation of "OR" pattern: !<s p o>!<s p o>
double negations of triple: <s p o>

Figure 2:
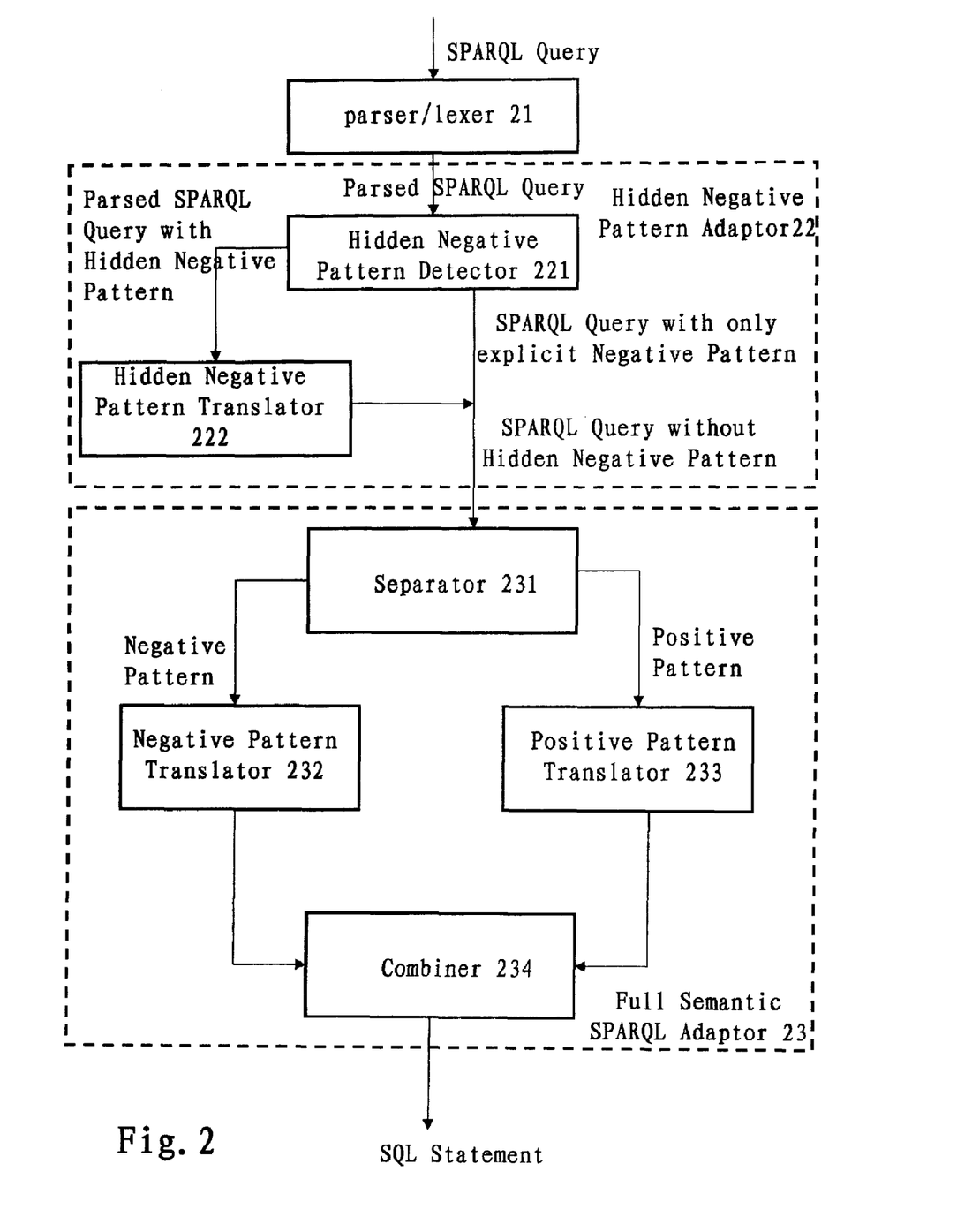
FIG. 2 is a block diagram showing a translation system for an SPARQL query according to one embodiment of the present invention.

Referring to FIG. 2, a block diagram shows a system supporting the translation of an SPARQL query according to the embodiment of the present invention. As shown in FIG. 2, the system includes the following three parts: parser/lexer 21, hidden negative pattern adaptor 22, and full semantic SPARQL adaptor 23. A description of how the system, according to the embodiment of the present invention, efficiently translates an SPARQL query statement with hidden negative pattern into an SQL statement is provided below with reference to FIG. 2.

First, the SPARQL query statement (hereinafter also referred to as "SPARQL statement" or "SPARQL query") enters the parser/lexer 21, and the parser/lexer 21 parses the SPARQL statement. As a standard query language, the parsing process of the SPARQL query statement is well known in the art and details thereof are thus omitted.

The parsed SPARQL statement enters the hidden negative pattern adaptor 22, and the hidden negative pattern adaptor 22 detects the hidden negative pattern in the parsed SPARQL statement and translates the hidden negative pattern into explicit negative pattern, where the hidden negative pattern adaptor 22 includes a hidden negative pattern detector 221 and a hidden negative pattern translator 222.

The hidden negative pattern detector 221 detects the hidden negative pattern in the parsed SPARQL statement. If the parsed SPARQL statement has hidden negative patterns, the hidden negative patterns will be transferred to the hidden negative pattern translator 222 or otherwise the parsed SPARQL statement will be directly outputted to the next stage.

Figure 3:
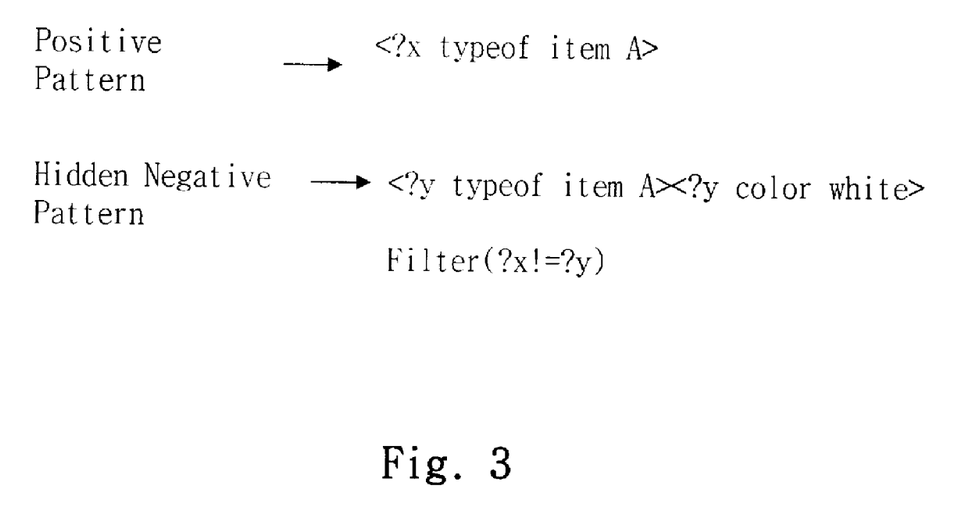
FIG. 3 is a view showing an example of the hidden negative pattern.

A detailed description of how the hidden negative pattern detector 221 detects the hidden negative pattern in the parsed SPARQL statement is provided. FIG. 3 shows an example of the hidden negative pattern. In summary, the hidden negative pattern has four characteristics as follows:

First, the hidden negative pattern has the same triples as those in positive pattern, and these triples differ from the triples of the positive pattern only in that the corresponding variables are different; for example, in FIG. 3, <?y typeof item A> is a duplicate of the triple <?x typeof item A> in the positive pattern and differs only in that the variable y is different from the corresponding variable x in the triple of the positive pattern.

Second, the different corresponding variables also exist in one additional triple; for example, in FIG. 3, the variable y also exists in the triple <?y color white>.

Third, in a filter condition expression, the corresponding variables in the positive pattern and the hidden negative pattern have an inequality relationship "!="; for example, in FIG. 3, the filter condition expression is "?x !=?y".

Fourth, if there are several hidden negative patterns, the filter condition expressions containing the inequality relationship "!=" are connected by an "OR" pattern.

The hidden negative pattern detector 221 detects the hidden negative pattern in accordance with the above-mentioned four characteristics, that is, when a single SPARQL query simultaneously contains the above-mentioned four characteristics, the SPARQL query has the hidden negative pattern. A person skilled in the art should know that, there can be various ways for detecting the above-mentioned four characteristics.

According to the embodiment of the present invention, the hidden negative pattern detector 221 can perform the following processing on the input SPARQL query so as to detect the above-mentioned four characteristics.

First, a filter condition in the SPARQL query is normalized to a disjunctive normal form. The disjunctive normal form refers to a disjunctive clause including of a definite number of simple conjunctive clauses. Suppose Ai (i=1, 2, . . . , s) is a simple conjunctive clause, A=A1∨A2∨ . . . ∨As, is a disjunctive normal form, for example, A1=p∧₁q, A2=₁q∧₁r, A3=p. The disjunctive normal form constructed by A1, A2, A3 is A=A1∨A2∨A3=(p∨₁q)∧(₁q∧₁r)∨p. This normalization is known by those skilled in the art. Then, a condition having two different corresponding variables with a tenable inequality relationship "!=" (hereinafter referred to as a pair of unequal variables) is extracted from the filter condition.

Connected sub-graphs represented by triples are extracted from the SPARQL query, and a maximal connected similar sub-graph is matched according to the pair of unequal variables and the connected sub-graphs, and the maximal connected similar sub-graph and an original connected sub-graph are compared to find out the difference therebetween. The difference represents an additional triple in the hidden negative pattern, and the additional triple and the triple represented by the maximal connected similar sub-graph constitute the hidden negative pattern. The SPARQL query in the foregoing text is taken as an example:

```
Select ?x,?z where {<?x BundleSale?y><?y
    BundleSale?z><?m BundleSale?o><?o
    BundleSale?n><?m BundleSale?n><?a
    BundleSale?b><?b BundleSale?c><?a
    BundleSale?a>Filter((?x !=?m OR?z !=?n)OR
    (?x !=?a OR ?z !=?c))}
```

Figure 8:
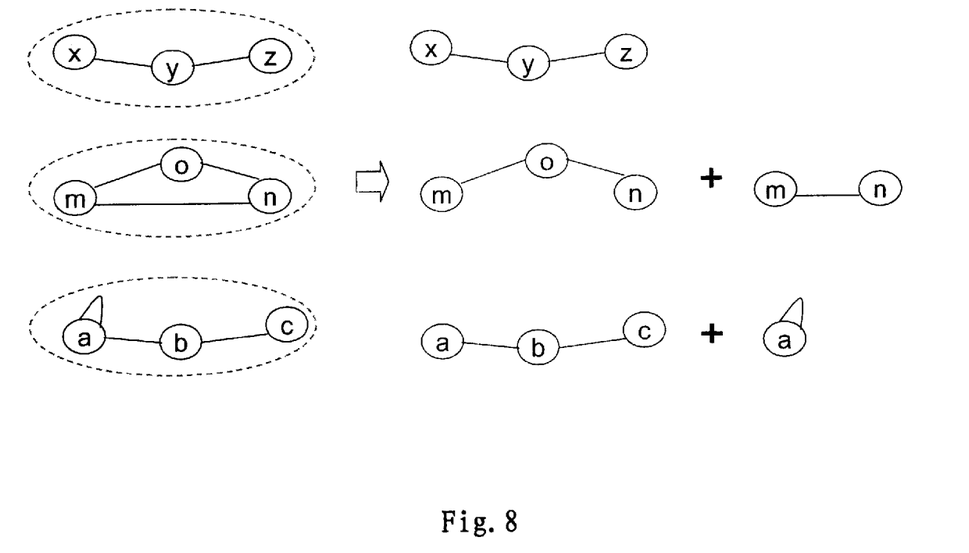
FIG. 8 is a schematic view showing connected sub-graphs extracted from an SPARQL query statement and their respective maximal connected similar sub-graphs according to the embodiment of the present invention.

Three connected sub-graphs formed by triples that are extracted from the query are as shown on the left side of FIG. 8. According to the pairs of unequal variables (x, m), (x, a), (z, n) and (z, c), maximal connected similar sub-graphs are matched from these three respective connected sub-graphs, as shown in the middle of FIG. 8. The connected sub-graphs on the left side of FIG. 8 and the maximal connected similar sub-graphs in the middle are compared to find out difference therebetween, as shown on the right side of FIG. 8. The difference represents such two additional triples as <?m BundleSale?n> and <?a BundleSale?a>. These two additional triples are combined with the triples represented by their respective maximal connected similar sub-graphs to obtain the detected two hidden negative patterns:

```
<?m BundleSale?o><?o BundleSale?n><?m Bundle-
    Sale?n> and <?a BundleSale?b><?b
    BundleSale?c><?a BundleSale?a>.
```

Alternatively, an order in which the maximal connected similar sub-graphs are sought can be determined according to the number of the pairs of unequal variables and the number of the connected sub-graphs, thereby reducing the calculation amount. When the number of the connected sub-graphs is greater, similar sub-graphs in the connected sub-graphs are verified with respect to each pair of variables in a list of unequal conditions; when the number of the pairs of unequal variables is greater, the pairs of unequal variables are verified with respect to each sub-graph in each connected sub-graph.

When the hidden negative pattern detector 221 detects the hidden negative pattern, the parsed SPARQL statement with the hidden negative pattern is transferred to the hidden negative pattern translator 222. The hidden negative pattern translator 222 translates the hidden negative patterns into explicit hidden patterns through the following process:

First, the triples in the hidden negative pattern that are duplicated with those in the positive pattern are removed. Taking the hidden negative pattern "<?y typeof item A> <?y color white>" as shown in FIG. 3 as an example, after the duplicated triple "<?y typeof item A>" is removed therefrom, the additional triple "<?y color white>" is left.

Then, the variable y in the additional triple is replaced by the corresponding variable x in the positive pattern "<?x color white>", and the additional triple "<?y color white>" is translated into "<?x color white>".

Finally, the negation flag "!" is added ahead of the translated additional triple, so that it becomes an explicit negative pattern "!<?x color white>".

The hidden negative pattern adaptor 22 has translated the query with the hidden negative pattern in the parsed SPARQL statement output from the parser/lexer 21 into a query with the explicit negative pattern.

The hidden negative pattern adaptor 22 is provided for the purpose of being compatible with the existing SPARQL syntax containing the hidden negative pattern. A person skilled in the art can understand that, if the SPARQL expresses a negative query using the explicit negative pattern introduced in the embodiment of the present invention, it is unnecessary to insert the hidden negative pattern adaptor 22 after the parser/lexer 21.

The parsed SPARQL statement without the hidden negative pattern output from the hidden negative pattern adaptor 22 is input to the full semantic SPARQL adaptor 23. The full semantic SPARQL adaptor 23 is used to translate the SPARQL statement into SQL statement. The term "full semantic" represents a generalization of the negative pattern and the positive pattern.

As shown in FIG. 2, the full semantic SPARQL adaptor 23 includes a separator 231, a negative pattern translator 232, a positive pattern translator 233 and a combiner 234. A detailed description of each of these parts is given below.

The separator 231 separates the input parsed SPARQL statement into a positive pattern portion and a negative pattern portion and outputs them to the positive pattern translator 233 and the negative pattern translator 232, respectively. Specifically, the separator 231 determines whether there is the negation flag "!" before each triple respectively, and if so, it is considered to be a negative pattern triple and is sent as an input into the negative pattern translator 232. If there is no negation flag before the triple, it is considered to be a positive pattern triple and is sent as an input into the positive pattern translator 233. For example, for an SPARQL query "<?x p ?y>!<?x q ?y>Filter(condition)", "<?x p ?y>" can be sent as an input into the positive pattern translator 233, while "!<?x q ?y> Filter(condition)" is sent as an input into the negative pattern translator 232. Alternatively, it is also possible to input "<?x p ?y>Filter(condition)" into the positive pattern translator 233 while "!<?x q ?y>" is sent as an input into the negative pattern translator 232. These two solutions are equivalent with regard to the ultimate translation result. Here we assume that the first solution is adopted.

The negative pattern translator 232 is used to translate the negative pattern in the inputted parsed SPARQL statement into a negative portion of SQL statement to be combined. The processing in the negative pattern translator 232 is specifically described below with reference to the flow diagram shown in FIG. 4.

Figure 4:
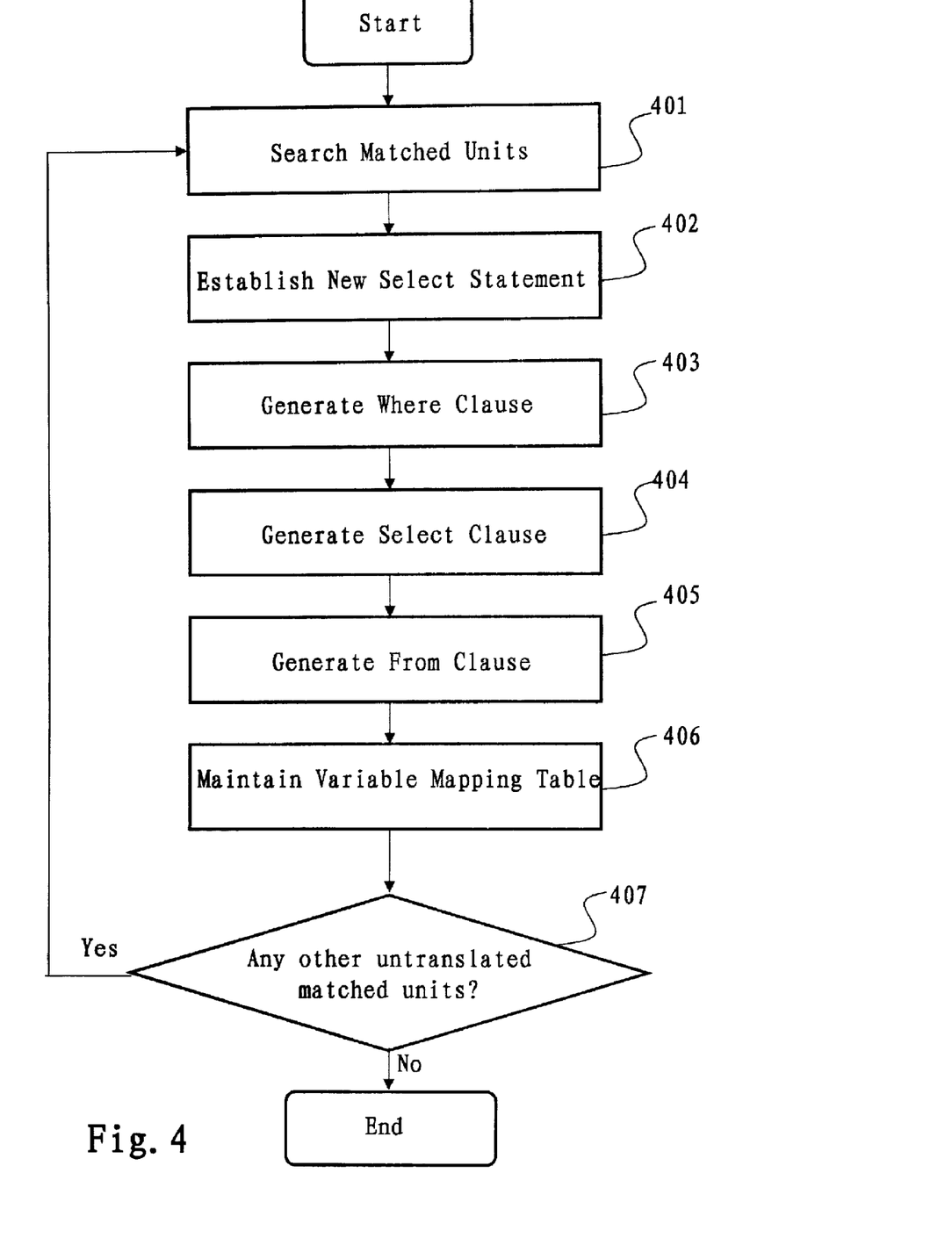
FIG. 4 is a workflow diagram showing a negative pattern translator according to one embodiment of the present invention.

First, at step 401, a SPARQL matched unit (mu) to be translated is searched. The matched unit can take on the form of "!<?x q ?y> Filter(condition)". At step 402, a new SELECT statement is established, and in the SQL, the SELECT statement includes WHERE, SELECT, and FROM clauses. At step 403, the WHERE clause is generated. The condition in the WHERE clause is generated by performing an "AND" operation on various conditions in the matched unit. At step 404, the SELECT clause is generated. Specifically, the variables in the matched unit are placed into the SELECT clause.

At step 405, the FROM clause is generated. Specifically, table names in the matched unit are extracted and placed into the FROM clause. The following negative portion of a SQL statement N-st is obtained:

Select T1.Col1, T1.Col2 FROM qTable T1
WHERE condition 1 AND condition 2 AND . . . condition N,
where T1 is a name of a table corresponding to a query in which the predicate is q, and the variables in the query are located in columns T1.Col1 and T1.Col2 of T1.

At step 406, a variable mapping table N-map is maintained, where the variable mapping table N-map is a table in which the variables in a negative pattern query correspond to the columns in a query table on a one-to-one basis. For example, Table 1 is an example of the variable mapping table, in which the variables x and y correspond to columns Col1 and Col2 in the table T1, respectively.

TABLE 1

| x | T1.Col1 |
| y | T1.Col2 |

At step 407, it is determined whether there is any other matched unit to be translated. If not, the whole process is completed, whereas if so, the process returns to step 401.

The positive pattern translator 233 translates the positive pattern triple in the SPARQL statement into an SQL statement. For example, "<?x p ?y>" in the SPARQL is translated into the following positive portion SQL statement P-st:

Select T2.Col1, T2.Col2 FROM pTable T1

A variable mapping table P-map as shown by FIG. 2 is maintained:

TABLE 2

| x | T2.Col1 |
| y | T2.Col2 |

Since there are positive patterns in the existing SPARQL language, the mode for carrying out this translation is known in the art and details thereof are omitted here.

Subsequently, the negative portion of the SQL statement N-st and the negative portion of the variable mapping table N-map output from the negative pattern translator 232, and the positive portion of the SQL statement P-st and the positive portion of the variable mapping table P-map output from the positive pattern translator 233 are sent as input into a combiner 234. The combiner 234 combines N-st and P-st into an ultimate SQL statement R-st.

When performing the combination, considering the diversity of the SQL syntax, there can be different ways for the combiner 234 to combine the negative portion of SQL statement N-st and the positive portion of SQL statement P-st into a complete SQL statement. Specifically, there exist three solutions: a NOT-IN command based solution, a NOT-EXIST command based solution, and a LEFT-OUTER-JOIN command based solution.

The NOT-IN command based solution is not applicable in all cases. Translation into a SQL statement containing the NOT-IN command can occur only when a dependency relationship exists among a plurality of variables in the SPARQL statement to be translated. However, both the NOT-EXIST command based solution and the LEFT-OUTER-JOIN command based solution can translate any SPARQL statement into a SQL statement, regardless of whether the dependency relationship exists among the variables in the SPARQL statement to be translated. Thus, emphasis is placed on the description of the last two solutions.

A LEFT-OUTER-JOIN command based SQL query statement has the following general format:

Select v1, v2, . . . .
From T1 LEFT OUTER JOIN T2 LEFT OUTER JOIN . . . ON(on condition)
Where (Where condition)

A description of a workflow of the combiner 234 according to the embodiment of the present invention based on a LEFT-OUTER-JOIN statement is provided blow.

At step 1, all positive portions of SQL statements P-st output from the positive pattern translator 233 are combined into a combined positive portion SQL statement (hereinafter referred to as comb-st), and all positive portion variable mapping tables P-map output from the positive pattern translator 233 are combined into a combined positive portion variable mapping table (hereinafter referred to as comb-map). This step is a known technique for those skilled in the art and can also be carried out in the positive pattern translator 233.

At step 2, the negative portions of SQL statements N-st output from the negative pattern translator 222 are combined, one by one, with comb-st obtained in step 1. Step 2 is specifically carried out as follows:

For each variable v in the negative portion variable mapping table N-map, let E1 represent a column to which the variable v in comb-map is mapped, such as column T2.Col1 in Table 2 to which the variable x is mapped; let E2 represent a column in N-map to which the variable v is mapped, such as column T1.Col1 in Table 1 to which the variable x is mapped; an On condition is generated as "E1=E2" and added to an on condition list;

A table corresponding to comb-st is left-outer-joined with a table corresponding to an N-st, with the generated condition in the condition list as the On condition.

The table on which the left-outer-join processing was performed in the previous step is added to the R-st's From clause;

For each variable v in comb-map, the column to which it is mapped is added to the R-st's Select clause;

For each variable v in N-map, let E2 represent a column in N-map to which the variable v is mapped, the condition "E2 is NULL" is added to the Where clause, because in the table generated by the left-outer-join operation, the contents of the columns to which the variables in the negative pattern are corresponding should be "NULL". For example, as shown in Tables 3-5, Table 5 is generated after "T3 LEFT OUTER JOIN T4 ON (T3.ID=T4.ID)" operation on Table 3 and Table 4 is performed, where the contents of two columns on the first line at the right side in Table 5 are "NULL".

TABLE 3

| ID | Company Name |
|---|---|
| 1 | ABC |
| 2 | IBM |

TABLE 4

| ID | Employee Number |
|---|---|
| 2 | 370000 |
| 3 | 5000 |

TABLE 5

| T3.ID | T3.Company Name | T4.ID | T4.Employee Number |
|---|---|---|---|
| 1 | ABC | NULL | NULL |
| 2 | IBM | 2 | 370000 |

The comb-st and n-st's Where clauses are added to the R-st's Where clause.

Figure 5:
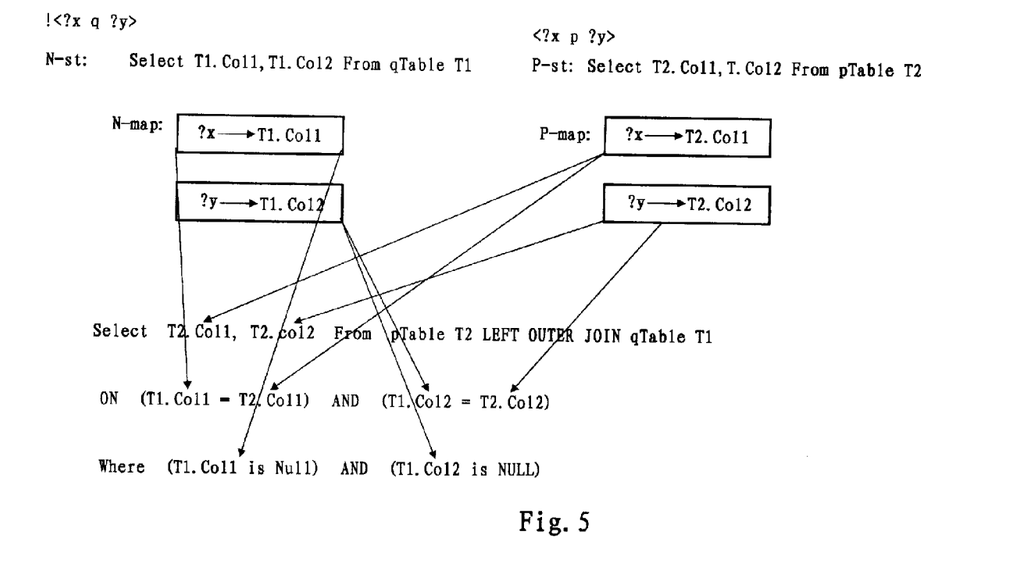
FIG. 5 is a schematic view showing a combining process performed by a combiner based on a LEFT-OUTER-JOIN command according to the embodiment of the present invention.

Through the foregoing steps, the combiner 234 can easily combine the output of the positive pattern translator 233 and the output of the negative pattern translator 232 into a LEFT-OUTER-JOIN-based ultimate SQL statement. FIG. 5 is a schematic view of an example of a combining process performed by the combiner 234 based on a LEFT-OUTER-JOIN command, and from FIG. 5, the correspondence between respective portions of an SPARQL query statement and respective portions of a SQL query statement is apparent.

In another variation of the embodiment according to the present invention, the combiner 234 can also further combine the output of the positive pattern translator 233 and the output of the negative pattern translator 232 into an ultimate SQL statement with the NOT-EXIST command based solution. The specific processing process is described in the following:

Step 1 in this embodiment is similar to that in the first embodiment, at which P-sts output from the positive pattern translator 233 are combined into comb-st, and all P-maps output from the positive pattern translator 233 are combined into comb-map.

At step 2, N-st and N-map output from the negative pattern translator 222 are combined, one by one, with comb-st and comb-map obtained at step 1, respectively. The specific implementation of step 2 in this variation of the embodiment according of the present invention is different from that described above.

For each variable v in N-map, let E1 represent a column in comb-map to which the variable v is mapped, such as the column T2.Col1 in Table 2 to which the variable x is mapped; let E2 represent a column in N-map to which the variable v is mapped, such as the column T1.Col1 in Table 1 to which the variable x is mapped; the condition is generated as "E1=E2" and added to the N-st's Where clause by means of "AND"; the condition "E2 is NOT NULL" is added to the N-st's Where clause by means of "AND";

NOT EXIST is added to the outer layer of N-st generated in the aforementioned steps as an expression of an EXIST command, and NOT EXIST and its expression together are placed as a condition into the comb-st's Where clause.

It should be noted that, if there exist a plurality of N-sts, one NOT EXIST clause should be generated from each N-st, and the generated plurality of NOT EXIST clauses are joined with "AND" to serve as the comb-st's Where clause, thereby forming an ultimate SQL statement R-st.

Figure 6:
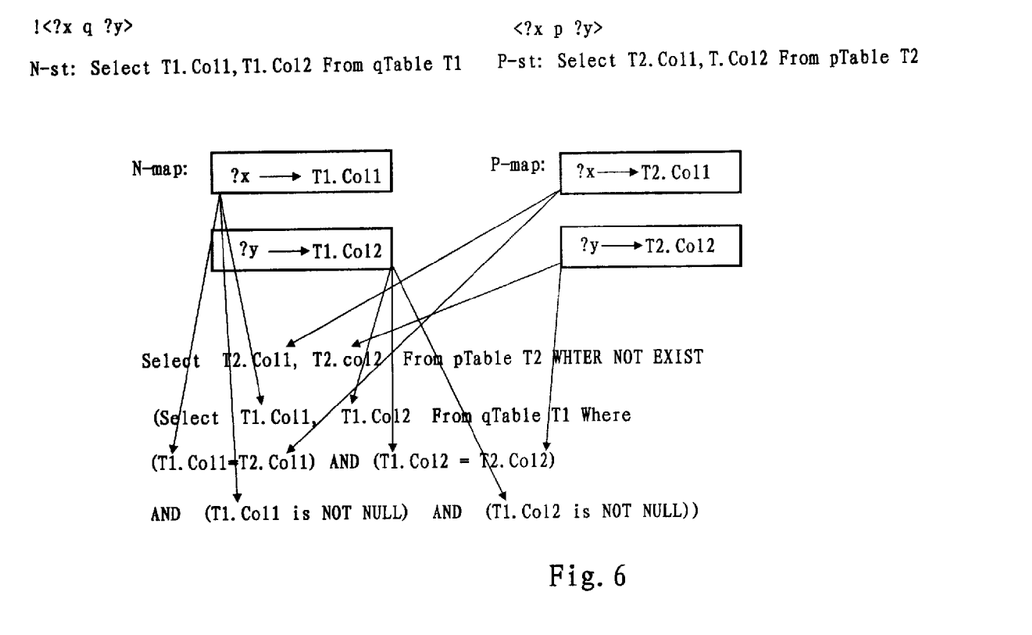
FIG. 6 is a schematic view showing a combining process performed by the combiner based on an EXIST command according to the embodiment of the present invention.

The combiner 234, through the foregoing steps, can easily combine the output from the positive pattern translator 233 and the output from the positive pattern translator 232 into an EXIST-based SQL statement. FIG. 6 is a schematic view of an example of a combining process performed by the combiner 234 based on an EXIST statement, and from FIG. 6, the correspondence between respective portions of an SPARQL query statement and respective portions of an SQL query statement is apparent.

Hereto, two preferred embodiments of the combiner 234 combining the output from the positive pattern translator 233 and the output from the negative pattern translator 232 into a SQL statement have been described. As reference, here are examples of the results of the translation of the various SPARQL queries into SQL statements based on the EXIST command and on the LEFT-OUTER-JOIN command.

1. Translation based on EXIST command
1.1 SPARQL query: <?x, p, o1>!<?x, q, o2>
SQL query: Select T1.xCol From pTable T1 where T1.yCol=o1 and NOT EXIST (Select T2.xCol From qTable T2 where (T1.xCol=T2.xCol AND T2.yCol=o2 AND T2.xCol is NOT NULL))
1.2 SPARQL query: <?x, p, ?y>!<?x, q, o2>
SQL query: Select T1.xCol, T1.yCol From pTable T1 where NOT EXIST (Select T2.xCol From qTable T2 where (T1.xCol=T2.xCol AND T2.yCol=o2 AND T2.xCol is NOT NULL))
1.3 SPARQL query: <?x, p, ?y>!<?x, q, ?y>
SQL query: Select T1.xCol, T1.yCol From pTable T1 where NOT EXIST (Select T2.xCol, T2.yCol From qTable T2 where (T1.xCol=T2.xCol) AND (T1.yCol=T2.yCol) AND (T2.xCol is NOT NULL) AND (T2.yCol is NOT NULL))
1.4 SPARQL query: <?x, p, ?y>!<?y, q, ?x>
SQL query: Select T1.xCol, T1.yCol From pTable T1 where NOT EXIST (Select T2.xCol, T2.yCol From qTable T2 where (T1.xCol=T2.yCol) AND (T1.yCol=T2.xCol) AND (T2.yCol is NOT NULL) AND (T2.xCol is NOT NULL))
2. Translation based on LEFT-OUTER-JOIN command
2.1 SPARQL query: <?x, p, o1>!<?x, q, o2>
SQL query: Select T1.xCol From pTable T1 LEFT OUTER JOIN qTable T2 on (T1.xCol=T2.xCol and T1.yCol=o1 and T2.yCol=o2) where (T2.xCol is NULL)
2.2 SPARQL query: <?x, p, ?y>!<?x, q, o2>
SQL query: Select T1.xCol, T1.yCol From pTable T1 LEFT OUTER JOIN qTable T2 on (T1.xCol=T2.xCol and T2.yCol=o02) where (T2.xCol is NULL)

2.3 SPARQL query: <?x, p, ?y>!<?x, q, ?y>
SQL query: Select T1.xCol, T1.yCol From pTable T1 LEFT OUTER JOIN qTable T2 on (T1.xCol=T2.xCol) AND (T1.yCol=T2.yCol) where (T2.xCol is NULL) AND (T2.yCol is NULL)

2.4 SPARQL query: <?x, p, ?y>!<?y, q, ?x>
SQL query: Select T1.xCol, T1.yCol From pTable T1 LEFT OUTER JOIN qTable T2 on (T1.xCol=T2.yCol) AND (T1.yCol=T2.xCol) where (T2.yCol is NULL) AND (T2.xCol is NULL)

A simpler translation system and method for SPARQL queries is shown in the second variation of the embodiment of the present invention. A description is provided below with reference to FIG. 7.

Figure 7:
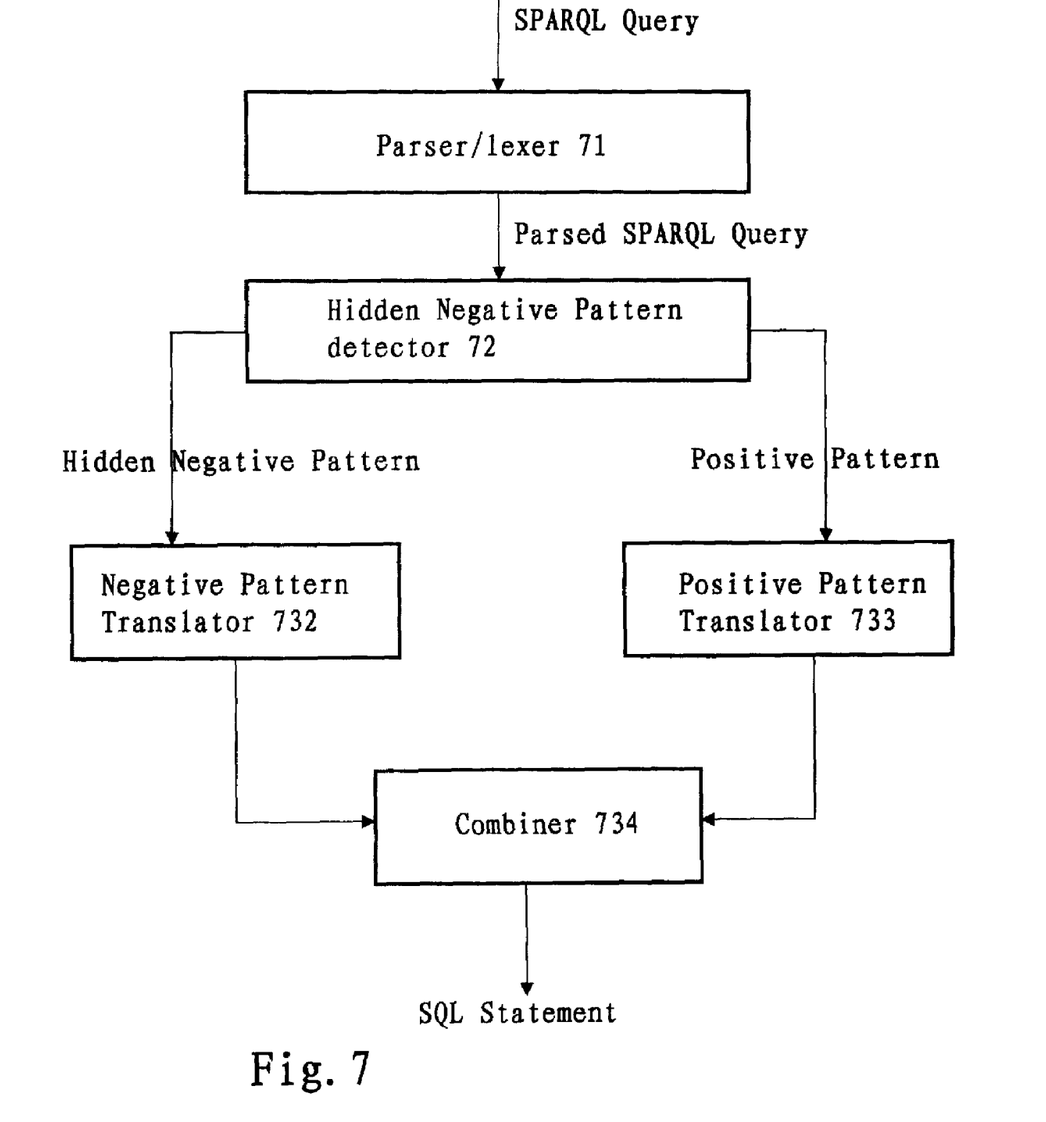
FIG. 7 is a block diagram showing a translation system for an SPARQL query according to another embodiment of the present invention.

FIG. 7 is a block diagram showing a system for translating a SPARQL query according to another embodiment in the present invention. As shown in FIG. 7, the translation system for the SPARQL query in this embodiment includes a parser/lexer 71, a pattern detection separator 72, a negative pattern direct translator 732, a positive pattern translator 733 and a combiner 734, where the parser/lexer 71, the positive pattern translator 733 and the combiner 734 have the same functions as the parser/lexer 21, the positive pattern translator 233 and the combiner 234 in the first embodiment of the present invention, and a description thereof is omitted here.

The pattern detection separator 72 detects a hidden negative pattern in the parsed SPARQL statement and transfers the detected hidden negative pattern to the negative pattern direct translator 732, and transfers the remaining portion, i.e. the positive pattern portion, to the positive pattern translator 733. The principle for the pattern detection separator 72 detecting the hidden negative pattern in the parsed SPARQL statement is substantially the same as that for the hidden negative pattern detector 221 in the first embodiment of the present invention, except that the pattern detection separator 72 in this embodiment outputs the positive pattern portion to the positive pattern translator 733 besides outputting detected the hidden negative pattern. Thus, the pattern detection separator 72 in this embodiment actually performs both detection and separation functions.

The negative pattern direct translator 732 in this embodiment of the present invention is different from the hidden negative pattern translator 222 in the first embodiment in that it combines the functions of the hidden negative pattern translator 222 and the negative pattern translator 232 in the first embodiment. Specifically, the negative pattern direct translator 732 in this embodiment is not required to first translate the hidden negative pattern transferred from the pattern detection separator 72 into the explicit hidden pattern "!<?x p ?y>" as defined in the first embodiment, but directly translates the hidden negative pattern in the SPARQL statement into a negative portion of a SQL statement. The specific processing process is described as follows:

At step 1, duplicated triples and an additional triple in the hidden negative pattern are identified.

At step 2, a SPARQL matched unit to be translated is searched. The matched unit is the additional triple and its filter condition. The subsequent steps are the same as steps 402-407.

Through the aforementioned processing, the negative portion of SQL statement output from the negative pattern direct translator 732 is the same as the output from the negative pattern translator 232 in the first embodiment of the present invention.

A system and method capable of efficiently translating a SPARQL query based on a virtual RDF store into a SQL query have been described above. A person skilled in the art will realize that, the embodiments of the present invention may be provided in the form of a method, system, or computer program product. Thus, the present invention may adopt hardware embodiments, software embodiments or embodiments of the combination of hardware and software. The event processing system of the present invention may be implemented using hardware, software or combination thereof. When implemented using the hardware, respective composite parts of the system may be separate ones, and one or more of the composite parts may also be integrated. The typical combination of hardware and software may be a universal computer system with a computer program, and when the program is loaded or executed, the above method may be performed by controlling the computer system.

The present invention may be embedded into a computer program product, which includes all the features which enable the described method to be implemented. The computer program product may be a computer readable signal medium or a computer readable storage medium.

A computer readable storage medium may be, for example, but not limited to, an electronic, magnetic, optical, electromagnetic, infrared, or semiconductor system, apparatus, or device, or a suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or a suitable combination of the foregoing. A computer readable storage medium may be a tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms, including, but not limited to, electro-magnetic, optical, or a suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or a suitable combination of the foregoing.

Computer program code for carrying out operations for aspects of the present invention may be written in one programming language or in a combination of two or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is illustrated above with reference to the flowchart and/or block diagram of the method, system and computer program product according to the present invention. Each block in the flow chart and/or block diagram and the combination of the blocks therein may be obviously realized by computer program instructions. These computer program instructions may be supplied to a processor of a universal computer, a dedicated computer, an embedded processor or other programmable data processing devices, so that an apparatus for realizing the functions specified in one or more blocks in the flow chart and/or block diagram is produced according to the instructions.

When the present invention is shown and described with reference to the exemplary embodiments, those skilled in the art will understand that, various modifications and transformations may be made without departing from the spirit and scope of the present invention as defined in the appended claims. The exemplary embodiments are described for a descriptive but not limiting purpose. Thus, the scope of the present invention is not defined by the embodiments, but by the appended claims and all the modifications and transformations within this scope should be understood as being contained in the present invention.

What is claimed is:

1. A computer-implemented method for translating a SPARQL query, comprising the steps of:
    parsing said SPARQL query, wherein said parsing step is performed using a parser/lexer;
    detecting a hidden negative pattern in said parsed SPARQL query, wherein said detecting step is performed using a hidden negative pattern detector;
    translating said detected hidden negative pattern into an explicit negative pattern, wherein said translating step is performed using a hidden negative pattern translator;
    separating said explicit negative pattern from a positive pattern in said parsed SPARQL query, wherein said separating step is performed using a separator;
    translating said explicit negative pattern into a negative portion of an SQL statement, wherein said step of translating said explicit negative pattern is performed using a negative pattern translator;
    translating said positive pattern into a positive portion of said SQL statement, wherein said step of translating said positive pattern is performed using a positive pattern translator; and
    combining said negative portion of said SQL statement with said positive portion of said SQL statement, wherein said combining step is performed using a combiner.

2. The method according to claim 1, wherein said hidden negative pattern detection step further comprises the steps of:
    normalizing a filter condition in said SPARQL query to a disjunctive normal form, wherein said normalizing step is performed using a normalizer;
    extracting, from said filter condition, a condition having a pair of unequal variables, wherein said extracting step is performed using a condition extractor;
    extracting connected sub-graphs represented by respective triples in said SPARQL query and matching respective maximal connected similar sub-graphs, wherein said step of extracting connected sub-graphs is performed by using a connected sub-graphs extractor; and
    matching hidden negative patterns in accordance with said respective maximal connected similar sub-graphs and differences between said respective maximal connected similar sub-graphs and corresponding connected sub-graphs, wherein said matching step is performed using a hidden negative pattern matching unit.

3. The method according to claim 1, wherein said hidden negative pattern translation step further comprises the steps of:
    removing a triple in said hidden negative pattern duplicated with those in said positive pattern, wherein said removing step is performed using a triplet removing unit;
    replacing variables in an additional triple in said hidden negative pattern by corresponding variables in said positive pattern, wherein said replacing step is performed using a variable replacing unit; and
    appending a flag representing a "NOT" logic to said translated additional triple, wherein said appending step is performed using an appending unit.

4. The method according to claim 1, wherein said negative pattern translation step further comprises the steps of:
    searching SPARQL matched units to be translated, wherein said searching step is performed by a searching unit;
    establishing a new SELECT statement using a SELECT statement establishing unit;
    generating a WHERE clause using a WHERE clause generating unit;
    generating a SELECT clause using a SELECT clause generating unit;
    generating a FROM clause using a FROM clause generating unit;
    maintaining a variable mapping table using a table maintaining unit; and
    determining whether there exists other matched units that have not been translated, wherein said determining step is performed using a determining unit.

5. The method according to claim 1, wherein said combining step further comprises:
    combining, one by one, said negative portion of said SQL statement and said combined positive portion of said SQL statement into a resulting SQL statement, wherein said step of combining one by one is performed using a serial combiner.

6. The method according to claim 5, wherein said resulting SQL statement comprises an EXIST command.

7. The method according to claim 5, wherein said resulting SQL statement comprises a LEFT-OUTER-JOIN command.

8. The method according to claim 1, wherein said explicit negative pattern is in the form of a flag representing a "NOT" logic appended to a triple.

9. A computer-implemented method for translating a SPARQL query, comprising the steps of:
    parsing said SPARQL query, wherein said parsing step is performed using a parser/lexer;
    detecting a hidden negative pattern in said parsed SPARQL query, and separately outputting said detected hidden negative pattern and a positive pattern, wherein said detecting step is performed using a hidden negative pattern detector;
    translating said detected hidden negative pattern into a negative portion of an SQL statement, wherein said translating step is performed using a hidden negative pattern translator;
    translating said positive pattern into a positive portion of said SQL statement, wherein said step of translating said positive pattern is performed using a positive pattern translator; and combining said negative portion of said SQL statement with said positive portion of said SQL statement, wherein said combining step is performed using a combiner.

10. The method according to claim 9, wherein said negative pattern direct translation step further comprises the steps of:

identifying an additional triple in said hidden negative pattern, wherein said identifying step is performed using a triple identifying unit;

searching a SPARQL matched unit having said additional triple and a filter condition, wherein said searching step is performed using a searching unit;

establishing a new SELECT statement using a SELECT statement establishing unit;

generating a WHERE clause using a WHERE clause generating unit;

generating a SELECT clause using a SELECT clause generating unit;

generating a FROM clause using a FROM clause generating unit;

maintaining a variable mapping table using a table maintaining unit; and determining whether there exists another matched unit that has not been translated, wherein said determining step is performed using a determining unit.

* * * * *